(12) United States Patent
Von Werther et al.

(10) Patent No.: US 8,402,099 B2
(45) Date of Patent: Mar. 19, 2013

(54) METHOD FOR CARRYING OUT A MULTIMEDIA COMMUNICATION BASED ON A NETWORK PROTOCOL, PARTICULARLY TCP/IP AND/OR UDP

(76) Inventors: Philipp Freiherr Von Werther, Weimar (DE); Steffen Röder, Weimar (DE)

( * ) Notice: Subject to any disclaimer, the term of this patent is extended or adjusted under 35 U.S.C. 154(b) by 459 days.

(21) Appl. No.: 12/675,046

(22) PCT Filed: Aug. 21, 2008

(86) PCT No.: PCT/EP2008/060986
§ 371 (c)(1),
(2), (4) Date: Mar. 26, 2010

(87) PCT Pub. No.: WO2009/027323
PCT Pub. Date: Mar. 5, 2009

(65) Prior Publication Data
US 2010/0205543 A1    Aug. 12, 2010

(30) Foreign Application Priority Data
Aug. 28, 2007  (DE) .......................... 10 2007 040 574

(51) Int. Cl.
*G06F 15/16* (2006.01)
(52) U.S. Cl. .................... 709/206; 709/203; 709/204
(58) Field of Classification Search .................. 709/203, 709/204, 206
See application file for complete search history.

(56) References Cited

U.S. PATENT DOCUMENTS

2006/0209727 A1* 9/2006 Jennings et al. ............... 370/260
2007/0033251 A1* 2/2007 Mandalia et al. ............. 709/204

FOREIGN PATENT DOCUMENTS

EP          1 304 878        4/2003
WO    WO 2007/055971        5/2007

OTHER PUBLICATIONS

International Preliminary Report on Patentability received May 19, 2010 of corresponding International Application No. PCT/EP2008/060986, filed Aug. 21, 2008.
International Search Report from PCT/EP2008/060986 dated Jun. 23, 2009.

* cited by examiner

*Primary Examiner* — Adnan Mirza
(74) *Attorney, Agent, or Firm* — Alston & Bird LLP

(57) ABSTRACT

The invention relates to a process for executing a multimedia communication, in particular a video, audio and/or text chat, between a totality of terminals (2) arranged in a communication network (1), which communication is based on a network protocol, in particular TCP/IP and/or UDP. The method is characterized in that at least one subscriber generates a personalized user account in the form of a virtual subscriber profile on a server (3) or in a peer-to-peer network, wherein, by setting up the virtual subscriber profile, the multimedia communication is established at each of the terminals. Thus, a mode of a subscriber selection preceding the communication, a communication type and/or a number of communication links to one of the terminals and/or the type of data transmission employed for the communication are freely defined. An arrangement for executing a process according to the preceding claims comprises a communication network with a valid communication protocol, in particular the internet (1). There are provided a plurality of terminals (2) having means for transmitting and receiving multimedia contents, and a server (3) or a peer-to-peer network having means for operating a hierarchical layer structure consisting of a database layer (4) for managing subscriber data, terminal addresses and multimedia contents, a link layer (5) for executing a switched communication between the terminals, a subscriber layer (6) for operating subscriber profiles set up by the users of the terminals, and a front end layer (7) having means for generating and operating a graphical user interface.

20 Claims, 12 Drawing Sheets

Figure 1:
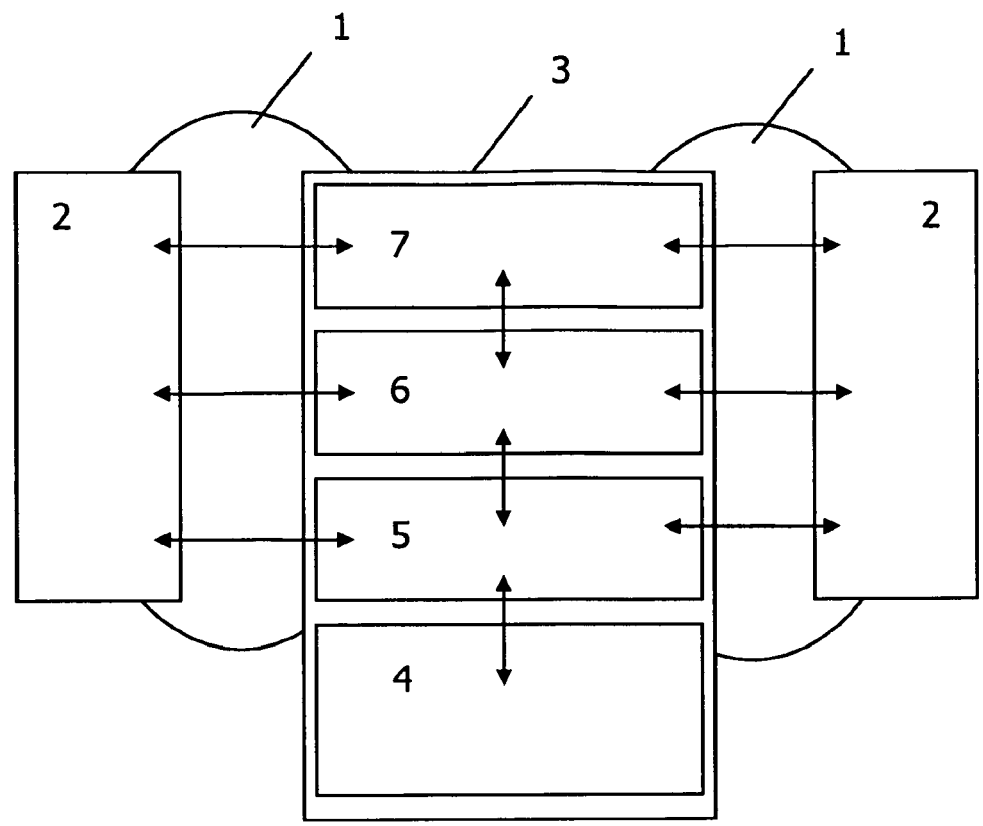

METHOD FOR CARRYING OUT A MULTIMEDIA COMMUNICATION BASED ON A NETWORK PROTOCOL, PARTICULARLY TCP/IP AND/OR UDP

BACKGROUND OF THE INVENTION

1. Field of the Invention

The invention relates to a process for executing a multimedia communication based on a network protocol, in particular TCP/IP and/or UDP, in accordance with the preamble of claim 1.

2. Description of the Related Art

Such communications relate above all, but not exclusively, to multimedia data transmissions via the internet and Internet services, providers and the corresponding hardware components. These are, in particular, terminals in the form of computers, mobile PCs or so-called hand-held devices that communicate with a dial-in node via a modem, ISDN or wideband circuits and access and execute web applications via corresponding means such as browsers.

A corresponding process for the transmission of communication data and a video conference and video chat system are described in WO 03/034730 A1. The document discloses a transmission of moving image data between two terminals in a packet-switched communication. The terminals comprise means for coding and decoding the moving image data in connection with audio data. The data can be recorded by a terminal and transmitted in real time to one or more terminals. This is accomplished by transmitting the video and/or audio data from any of the participating terminals to a common server. The transmitted video and audio data are separately collected for each terminal, are coded and continuously transmitted to receiving terminals, wherein each subscriber at the receiving terminals can view several other subscribers as live images on a monitor of his terminal and, in addition, communicate with them both audio-visually or in text form.

This chat system may be supplemented with moderation functions, wherein a subscriber having particular rights grants other subscribers moderation rights or withdraws them, or connects additional subscribers or excludes them from the chat.

However, the process described in this document realizes the increasingly higher, differentiated and more complex communication requirements of the participating users only very inadequately. The interaction of different users, who communicate with each other and exchange information and data via networks such as the Internet, has reached a complexity in recent years which is called "social networks" or "communities", which have become a complement to internet-based communication networks. An example of this are the Internet communities "MySpace" on an international level or "StudiVZ" in the German area.

These require very different and advanced and more flexible technical means and processes that exceed pure video, chat and conference systems and that have to reproduce the existing contacts between the subscribers as closely to reality as possible. Specifically, this relates to the way how subscribers represent themselves in the web, how they meet and find each other, how they join to form sub-networks having their own collective identity, where they communicate in closed or semi-open areas, thereby dissociating from the larger network and appearing towards the outside world.

Thus, the previously effective clear separation between the provider of a website and the user of the website gets more and more lost. Each of the subscribers to such a social network or such a community is, at the same time, a subscriber among many. On the other hand, he is able to input and maintain his own information, and determine himself who may retrieve these information, and under which conditions. The presently available video and chat systems are not suited for these extensive, new requirements and have proved to be too constrictive for this purpose.

Therefore, it is the object to override the constrictions of the previously known video and chat systems and extend and upgrade the basic functions of such systems so as to allow the realization of social networks and web-based communities in a manner as flexible as possible.

BRIEF SUMMARY OF VARIOUS EMBODIMENTS OF THE INVENTION

The object is achieved with a process for executing a multimedia communication, in particular a video, audio and/or text chat, between a totality of terminals arranged in a communication network, which communication is based on a network protocol, in particular TCP/IP and/or UDP, said process being characterized by the following inventive feature:

At least one subscriber generates a personalized user account in the form of a virtual subscriber profile on at least one server, wherein, by setting up the personalized subscriber profile, the multimedia communication is established at each of the terminals. By means of this setting-up process a mode of a subscriber selection preceding the communication, a communication type and/or a number of communication links to one of the terminals and/or the type of data transmission employed for the communication are freely defined.

Thus, before it comes to the execution of the multimedia communication, each subscriber initially sets up a personalized user account in the form of a virtual subscriber profile on at least one server or in a peer-to-peer network. The personalized user account is generated in the form of a virtual subscriber profile. This means that in addition to the basic account functions such as a password selection or a memory assignment, the subscriber has means available in order to represent himself and his person comprehensively inside the network. This particularly relates to uploading an image, a text for his self-portrayal, special means to alter the appearance in the display of the subscriber profile and the like functions.

Thus, the account describes the identity of a subscriber within the process. The account includes in particular: login data, contacts, the profile, switching and management-relevant data and other entries. By setting up this generated virtual subscriber profile, the multimedia communication of the subscriber to be executed is then established at each terminal. By this, the subscriber profile defines the subscribers as well as in what way, in what number and how the owner of the subscriber profile wants to communicate with them. The point is to predefine by the details in the subscriber profile preferences and basic parameters, on the basis of which the subscriber wants his multimedia communication to take place. The subscriber profile thereby determines the subscriber selection mode, which precedes the communication, the type of the communication and the number of the communication links and the type of data transmission, respectively.

The subscriber selection mode includes, in a first embodiment, an activatable random process for setting up a communication link between a selecting terminal of a first subscriber profile to at least one other terminal of a random subscriber profile.

This allows for an "accidental meeting" of two subscribers characterized by their subscriber profiles. The subscriber selection is carried out according to the subscribers' wishes in such a way that a first subscriber is connected to any randomly selected other subscriber and can communicate with him. This involves a certain surprise effect similar to that encountered in everyday life.

According to another embodiment the subscriber selection mode can include an activatable search process for establishing a communication link between the selecting terminal of the first subscriber profile and at least one other terminal of a subscriber profile which is determined by inputting search parameters.

Thus, the subscriber has the possibility to communicate with a subscriber, whose subscriber profile corresponds to inputted search criteria and whose interests are, therefore, similar to those of the selecting subscriber.

In another embodiment the subscriber selection mode includes an activatable call procedure for establishing a communication link between the selecting terminal of the first subscriber profile and at least one other terminal of a subscriber profile stored in a selection list.

This embodiment allows the subscriber to make a note of one or more subscribers, more exactly their subscriber profiles, or to select specific communication partners who are preset or important to each subscriber, and to establish a communication link with them. This particularly means that a subscriber can make a note of friends or acquaintances or other persons of interest to him, without having to search for them anew each time.

In another embodiment the subscriber selection mode includes an activatable blocking function for avoiding and/or rejecting a communication request through the selecting terminal of the first subscriber profile from at least one other terminal of a subscriber profile stored in a blacklist.

In this embodiment the subscriber can prevent from the very beginning other subscribers from communicating with him, by making a note of their subscriber profiles in a suitable manner. Thus, all communication requests from the corresponding subscribers are rejected, or the subscriber himself prevents any own connection attempt made by himself to the corresponding subscriber profiles.

For each of the terminals there is provided for this purpose an own, freely alterable selection list and/or blacklist which is defined by at least one subscriber profile. This means that a subscriber then defines by means of his subscriber profile a selection list or blacklist valid for the terminal he is presently using or where he has just logged himself in. Thus, the subscriber cannot bypass his own or foreign selection lists by simply using another terminal.

In one embodiment the setup of the subscriber profile allows that the type of the current communication be switched at each of the terminals between a one-to-one type, a one-to-many type, a many-to-one type and a many-to-many type.

The one-to-one type corresponds to a communication from subscriber to subscriber or from one terminal to another terminal, said communication being performed "in private". The one-to-many type corresponds to a communication between one subscriber to several subscribers at the same time, or between one terminal and several other terminals, in which the subscriber rather acts as the transmitter. This type of communication corresponds, for example, to sending a stream and differs from the many-to-one type in that, in the latter case, the subscriber rather is a recipient for several other transmitting subscribers. The many-to-many type corresponds to the type of a chat or conference call which is public or accessible to several subscribers and is substantially without a hierarchy, in which more or less everyone communicates with everyone.

In another embodiment, the setup of the subscriber profile allows during the execution of a communication between a first terminal and a second terminal according to the one-to-one type the execution of a communication in a pseudo one-to-one type, wherein at least one other parallel communication according to the one-to-one type is possible between the first and at least one other terminal.

In this type of communication the subscriber connects during a one-to-one communication in progress at least one other one-to-one communication with at least one other subscriber and, thus, establishes several one-to-one communications, which are executed simultaneously and parallel to one another.

In another embodiment, the setup of the subscriber profile allows during the execution of a communication according to the one-to-many type the execution of a communication between the terminal of an actor subscriber profile and a viewer totality comprised of the terminals of several viewer subscriber profiles. Below, a subscriber will be referred to as actor, who has made his media stream accessible to a broad public.

In this type of communication, a subscriber profile is set up as actor subscriber profile. The viewer totality is realized by expediently defining other subscriber profiles on the actor subscriber profile. The communication is now carried out in such a way that the actor subscriber profile transmits to or communicates with the viewer totality in general, without having to invoke or select individual subscriber profiles.

In another embodiment, the setup of the subscriber profile allows during the execution of a communication according to the many-to-one type the execution of a communication between the terminal of a viewer subscriber profile and an actor totality comprised of the terminals of several actor subscriber profiles.

Here, a subscriber defines on his subscriber profile a totality of several other subscriber profiles, from whom he wishes to receive information and data. The so defined totality now forms the actor totality, whereof each subscriber is able to transmit data. The subscriber need not select each individual other subscriber profile separately, but is granted global access to all possible transmitters within the network.

In another embodiment, the setup of the subscriber profile executes during a communication according to the many-to-many type a communication within a terminal pool defined by a set of previously defined subscriber profiles, wherein each of the terminals executes a communication with any of the terminals of the terminal pool.

That is, by selecting a totality of subscriber profiles according to freely selectable aspects a terminal pool is defined, within which everyone can execute a communication with everyone. This corresponds to a multimedia conference call in a delimited, free definable subrange of the set of subscribers.

The subscriber profiles belonging to the viewer totality, the actor totality and/or the terminal pool are freely definable by the at least one actor subscriber profile, the at least one viewer subscriber profile or by at least one moderator. This means that each subscriber can make his own decision whether or not he wants to be part of the aforementioned totality. Moreover, the moderator can add a subscriber profile to the aforementioned totalities or remove it from the same.

The freely selectable type of the data transmission taking place during the communication includes, according to a first embodiment, a selection between a communication in real time and/or a transmission and receipt of a stream.

In another embodiment, the freely selectable type of the data transmission taking place during the communication includes a selection between different communication channels, especially a video, an audio and/or a text channel, and a channel for a file transfer or a common access to web applications.

In an expedient embodiment, the aforementioned communication is supplemented with an information and acknowledgment channel, which may be used for transmitting meta data.

The terminals arranged in the communication network and the communication executed between the terminals are managed by at least one server or by a peer-to-peer network. The data transmission is realized via at least one server or via a peer-to-peer network, wherein the at least one subscriber profile, which is preferably managed by the server, executes a logical assignment between at least one terminal and a subscriber using the terminal. In connection with this, the respective terminal is addressed by the logical assignment of the terminal to the subscriber profile.

In an expedient embodiment tag variables for defining basic communication functions, in particular for enable and blocking functions, are set and altered by the at least one subscriber profile. The tag variables are special keywords or parameters that appear on the subscriber profile and are easy to enter, which describe the subscriber and his interests. Thus, the assignment of the enable and blocking functions forms part of the self-portrayal of the subscriber and may thus also be access objects for search functions.

By the at least one subscriber profile general subscriber data, in particular personal data and data for a self-portrayal of the subscriber are inputted and displayed. In another advantageous embodiment the at least one subscriber profile inputs and alters at least one link to at least one other subscriber profile and/or a stream. Thus, the subscriber profile refers to a stream, which may be outputted to a plurality of other subscriber profiles. Thus, the subscriber profile becomes an actor subscriber profile which was already mentioned above.

Expediently, the at least one subscriber profile is designed such that an incorporation of own data or data of third providers by a subscriber can be executed, in particular files, plugins and internet services. Thus, the subscriber profile can be supplemented with attractive and useful embodiments.

The process according to the invention shall be explained in more detail below by means of some exemplary embodiments. The accompanying FIGS. 1 to 11 serve illustrating purposes.

BRIEF DESCRIPTION OF THE SEVERAL VIEWS OF THE DRAWING(S)

Figure 1A:
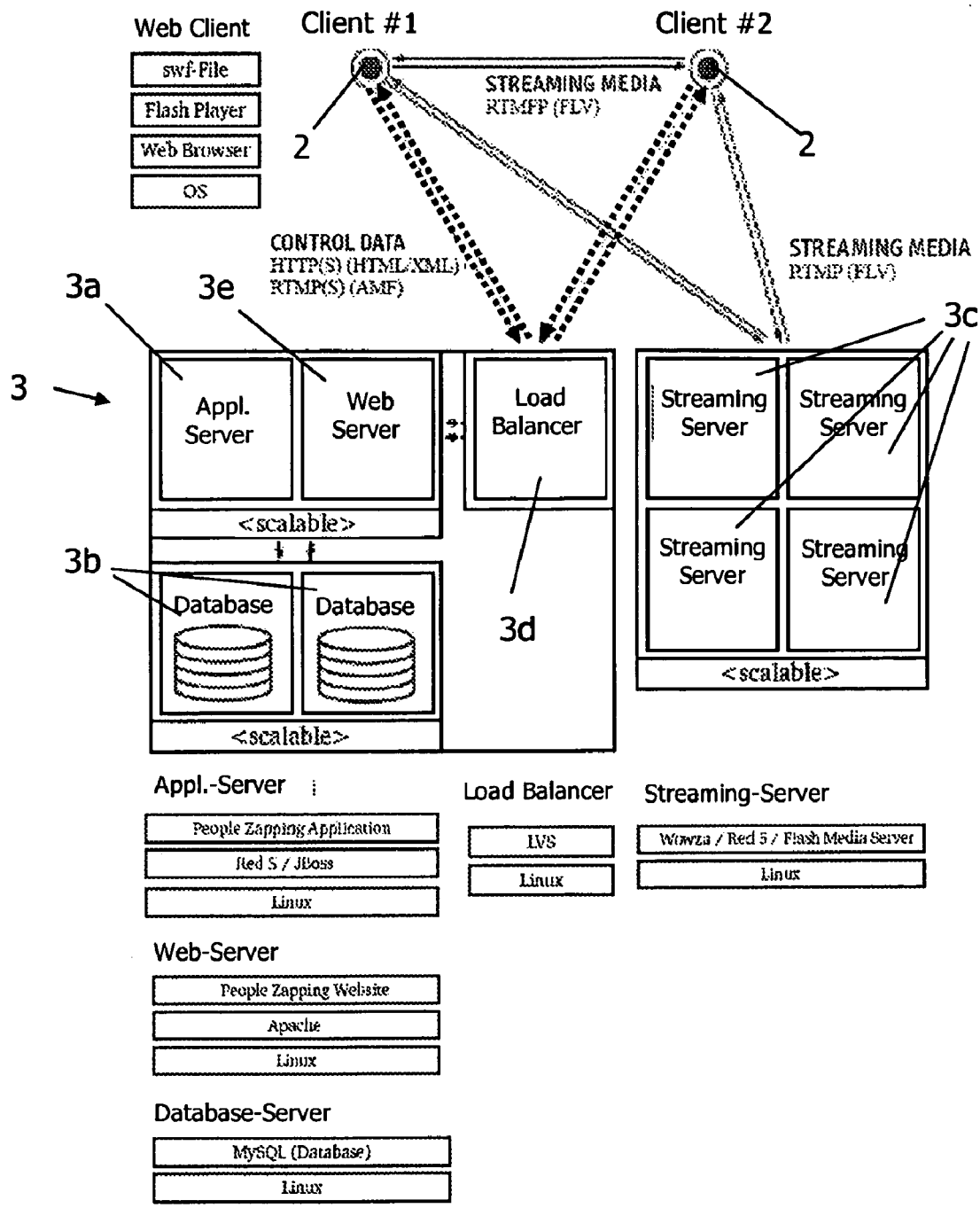
Figure 2:
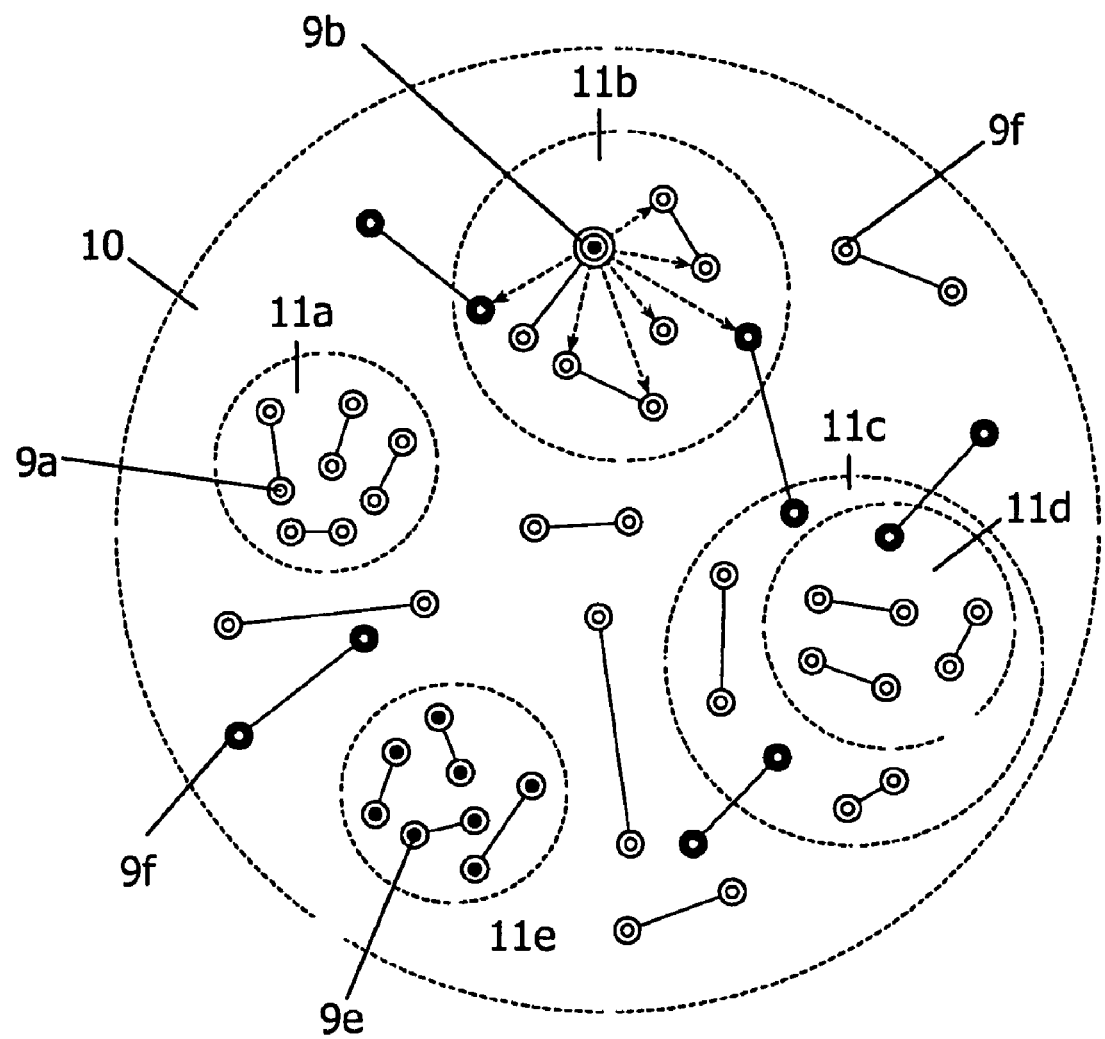
Figure 3A:
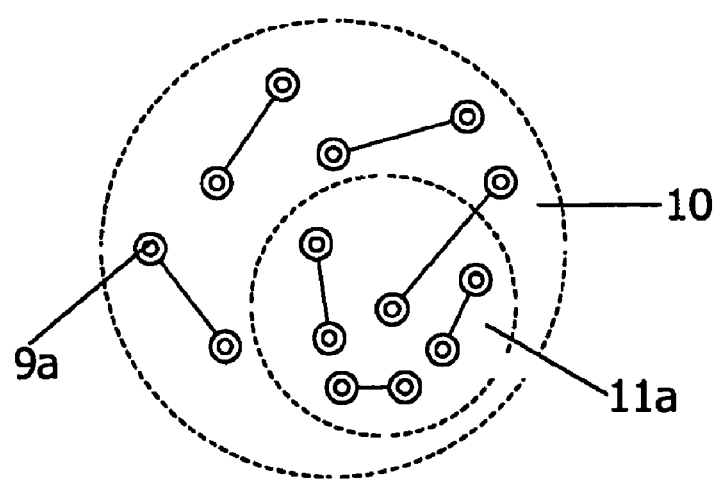
Figure 3B:
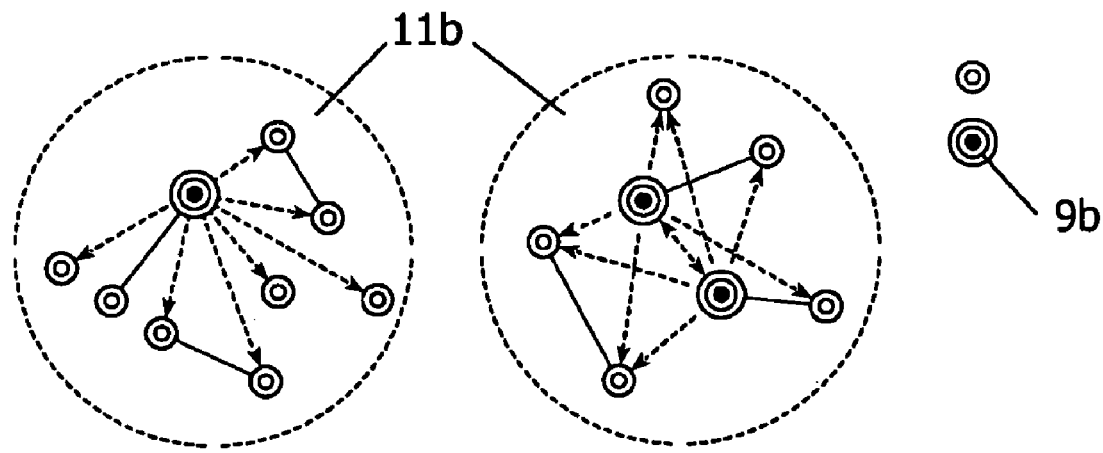
Figure 4A:
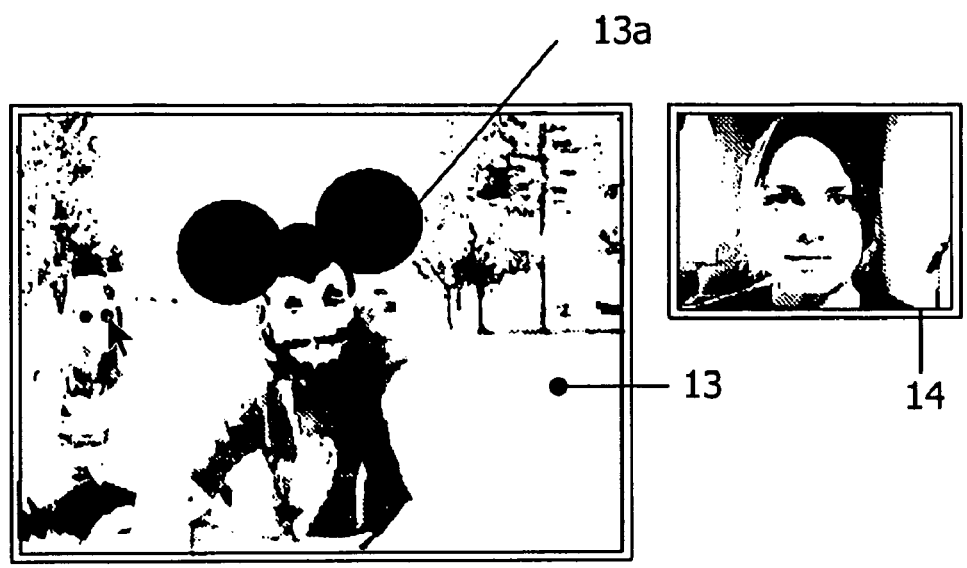
Figure 4B:
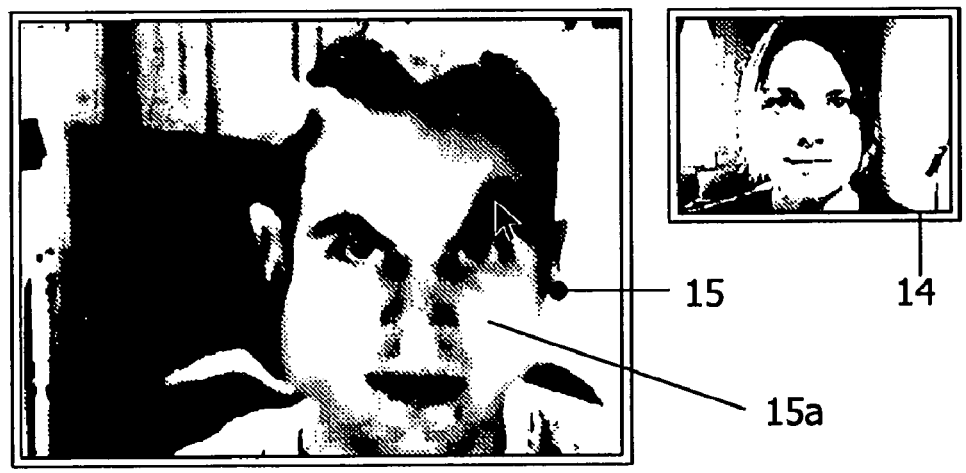
Figure 5A:
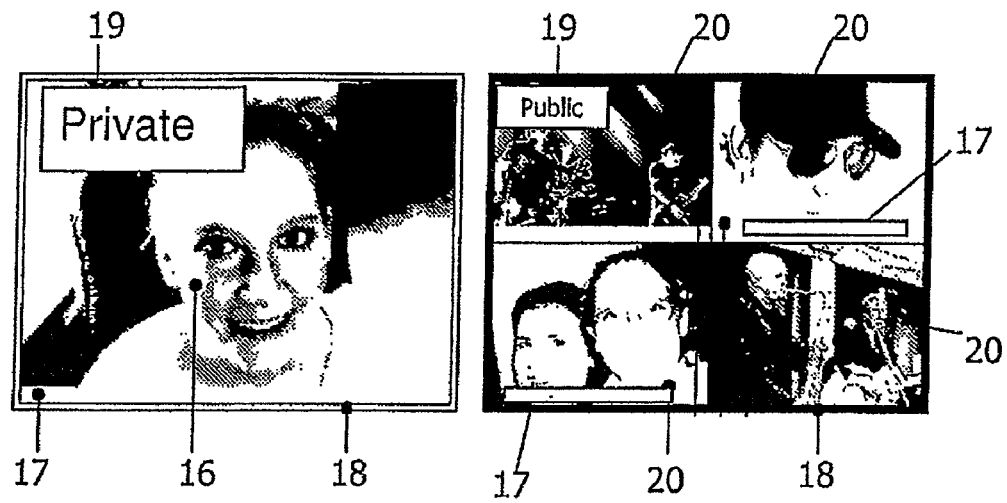
Figure 5B:
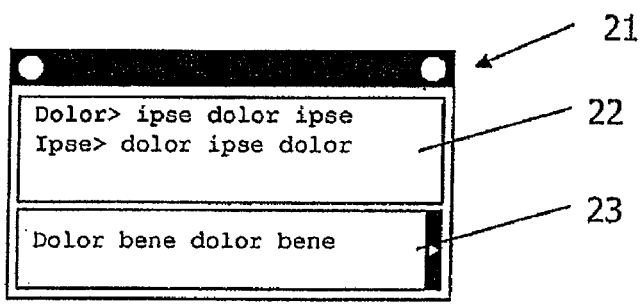
Figure 5C:
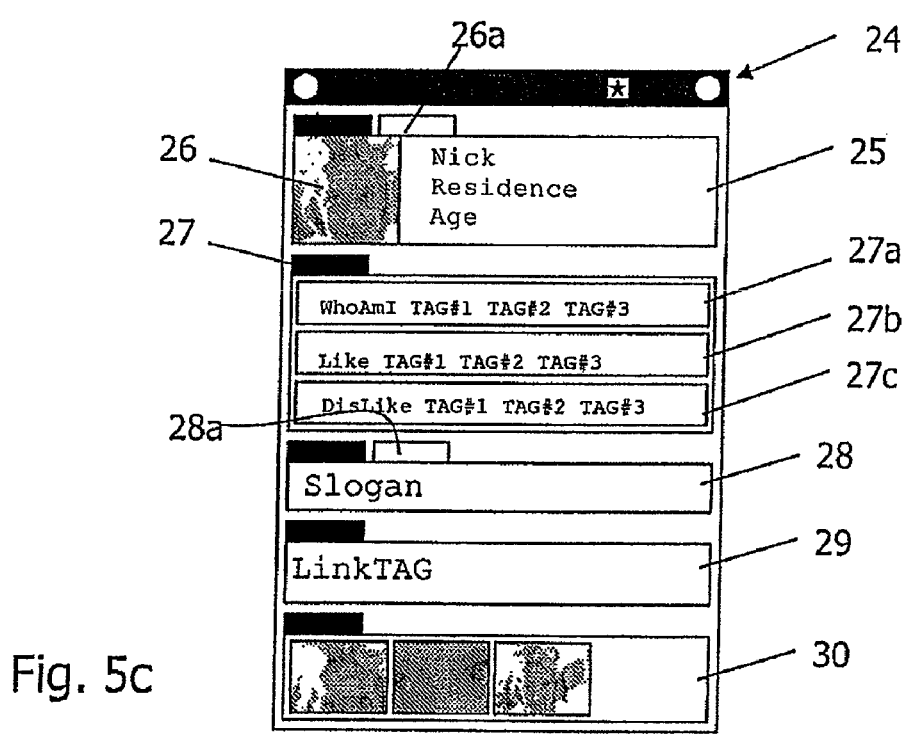
Figure 6:
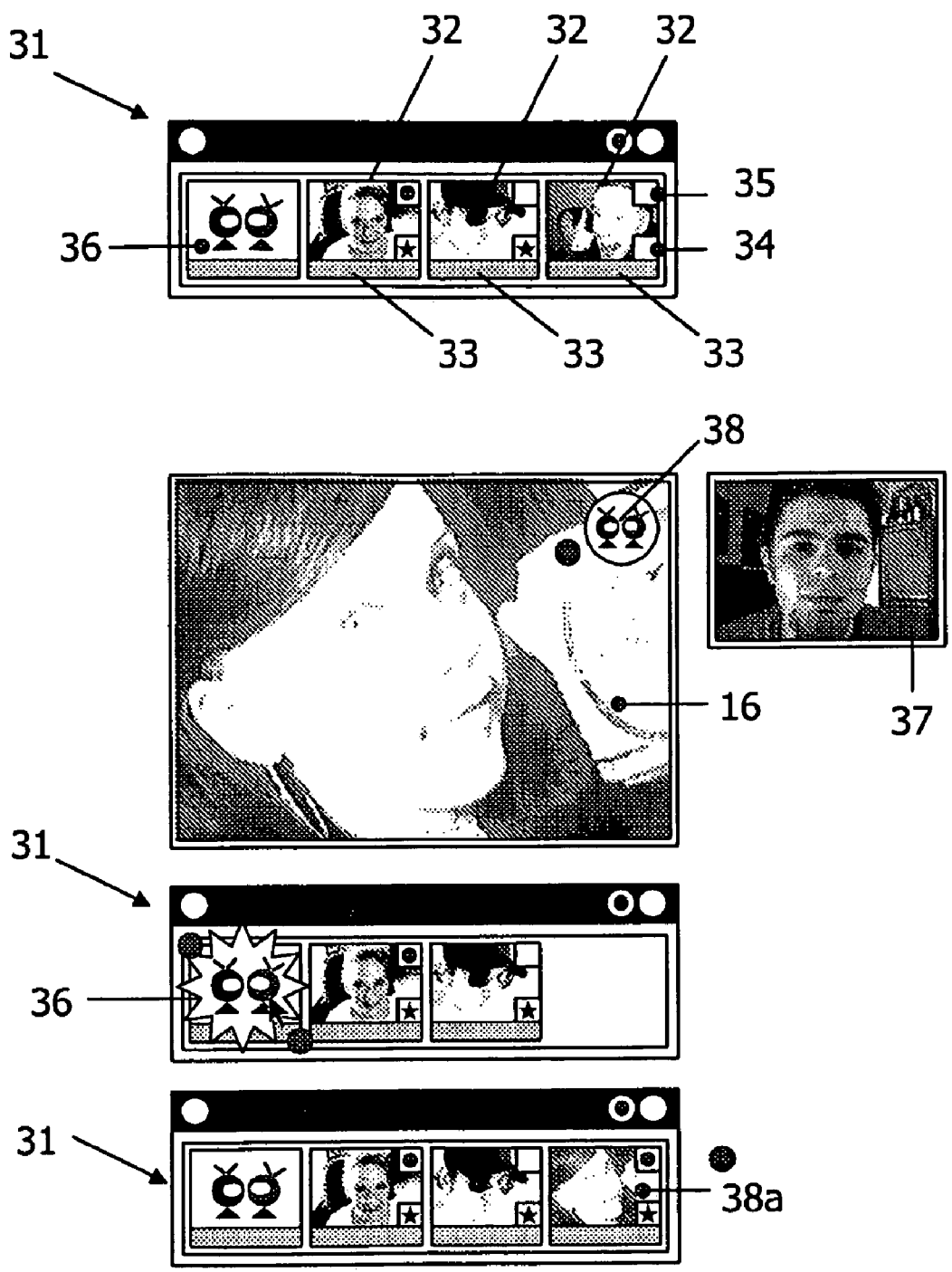
Figure 7A:
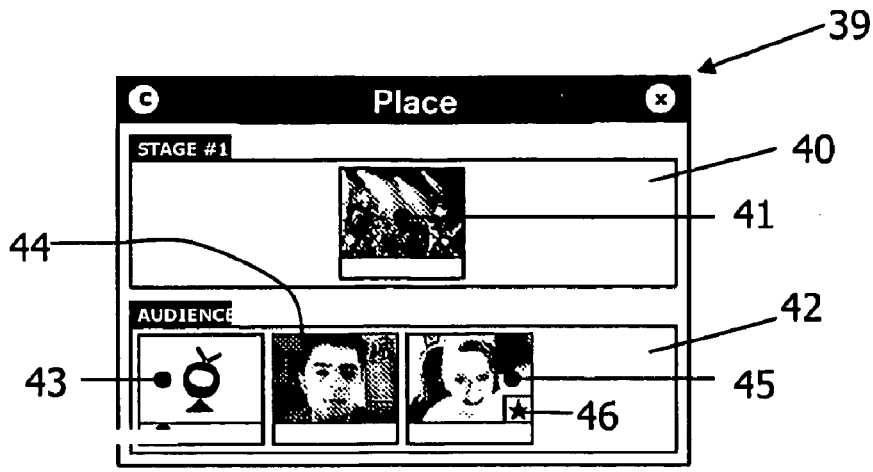
Figure 7B:
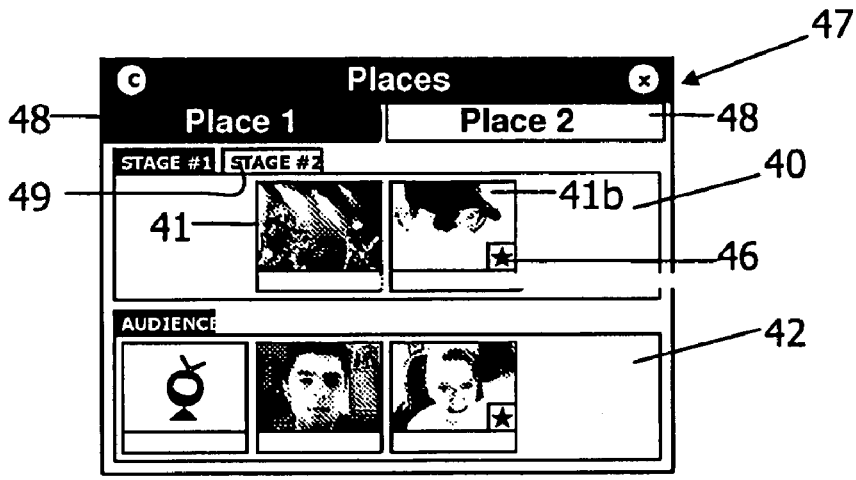
Figure 7C:
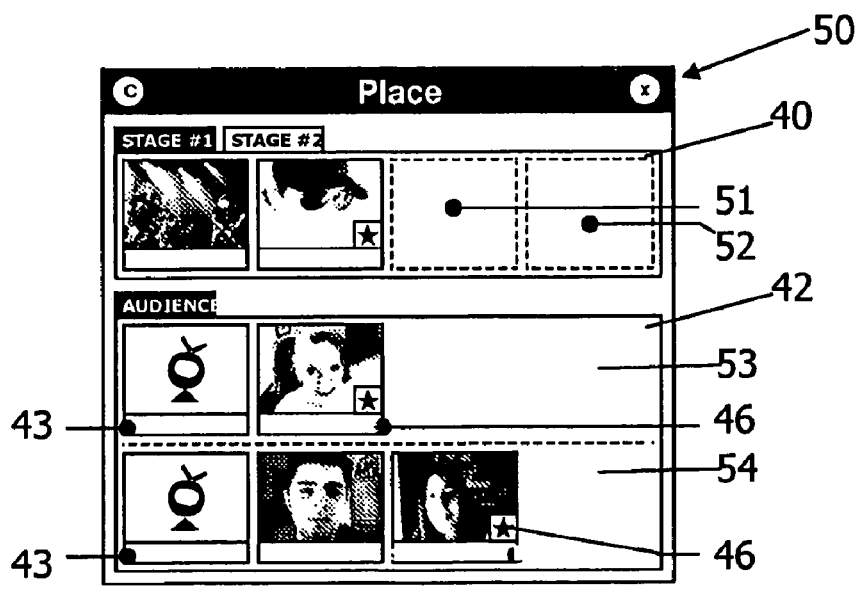
Figure 8:
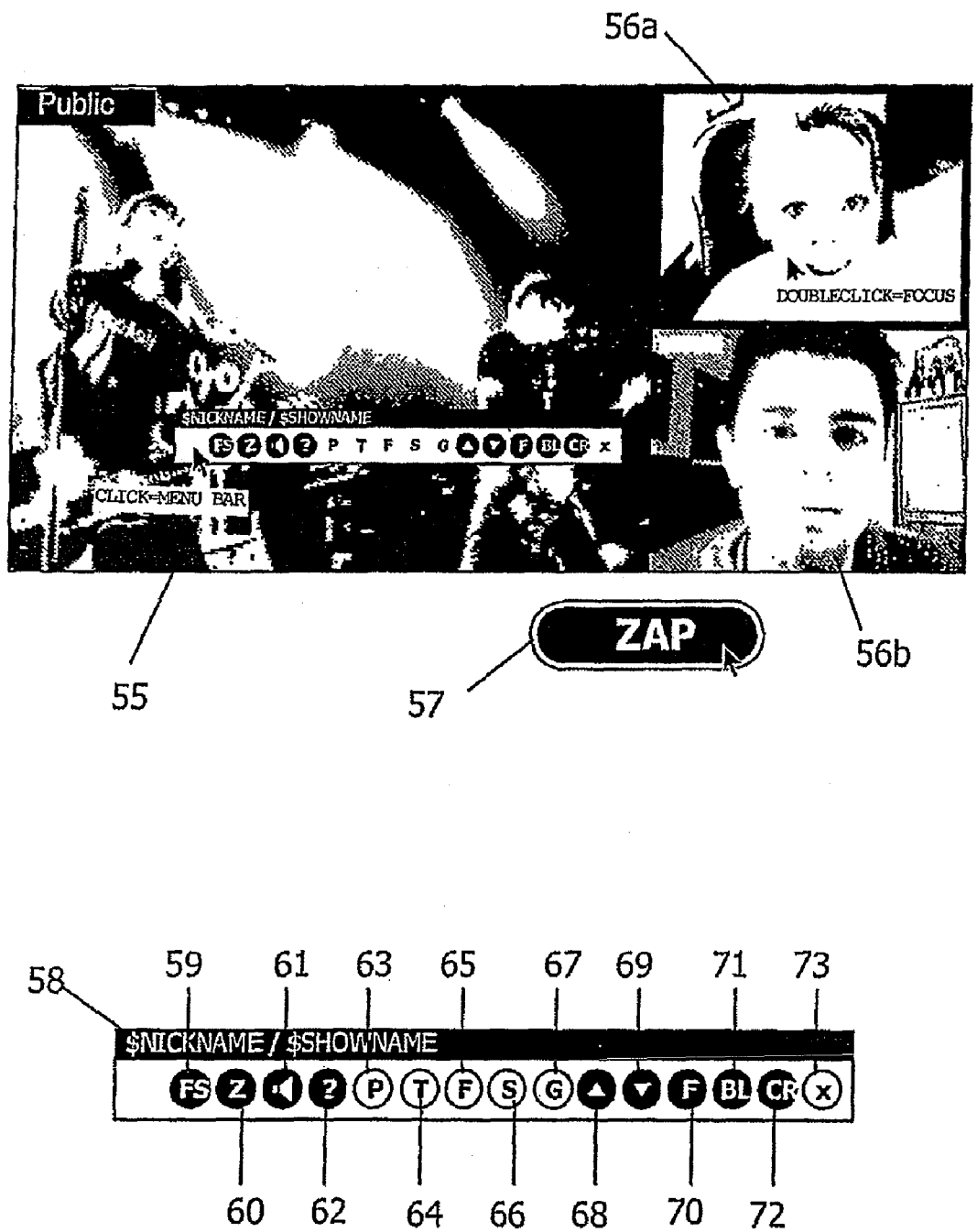
Figure 9:
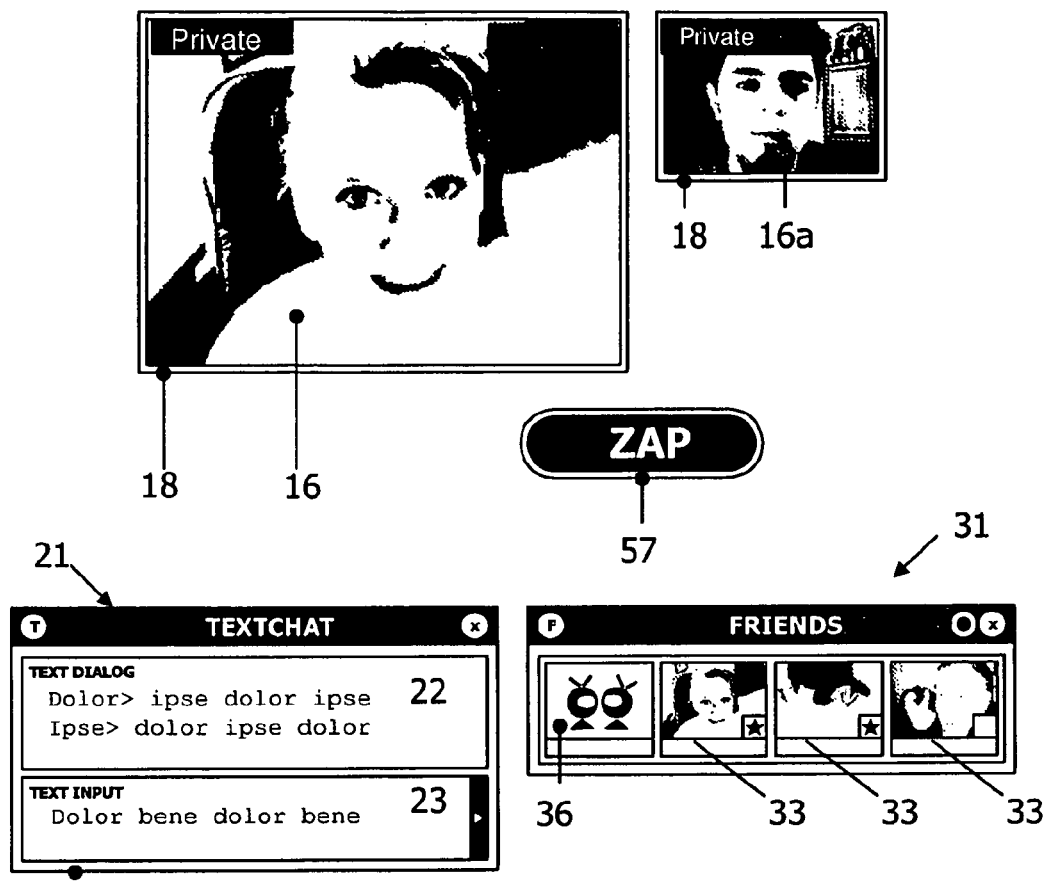
Figure 10:
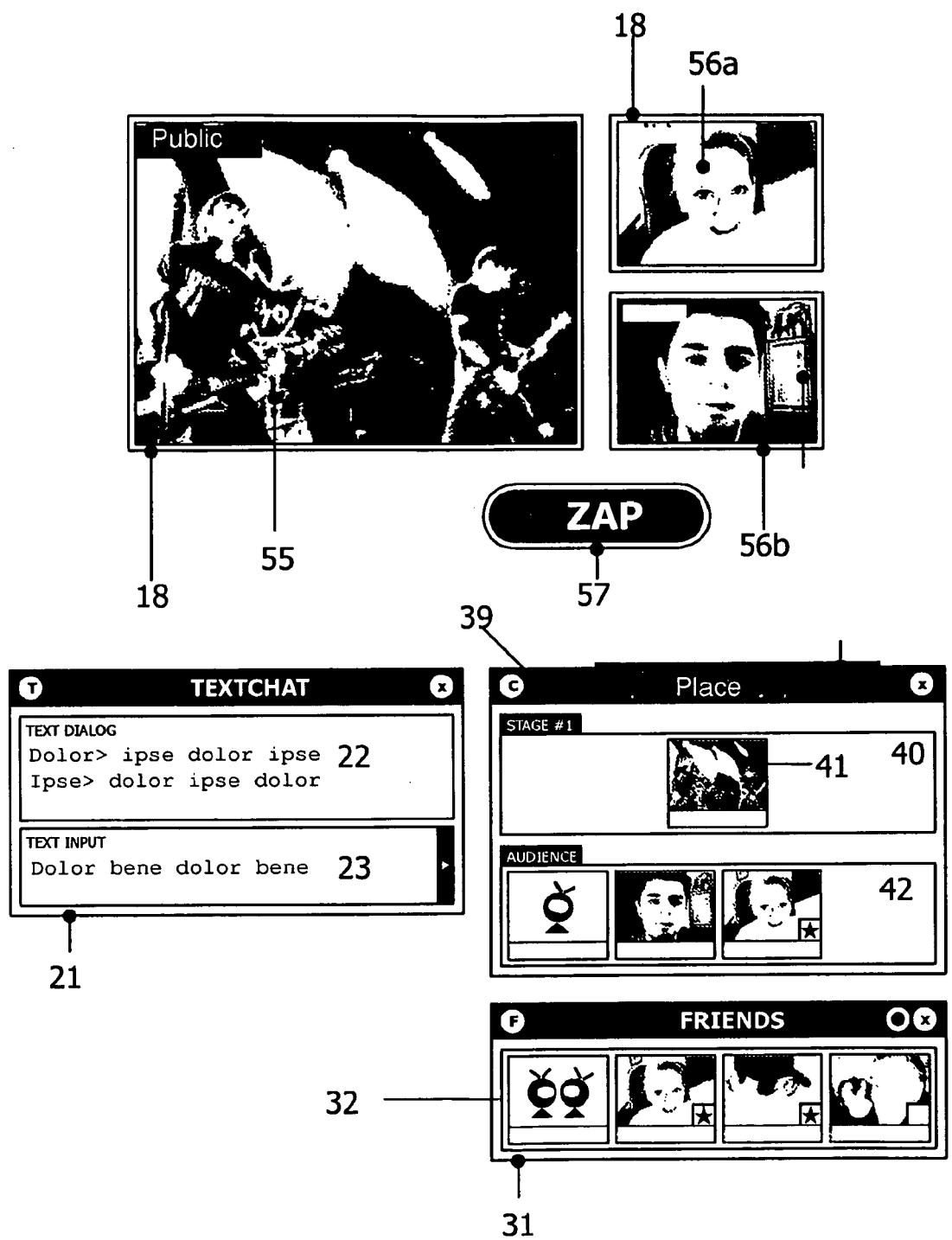
Figure 11:
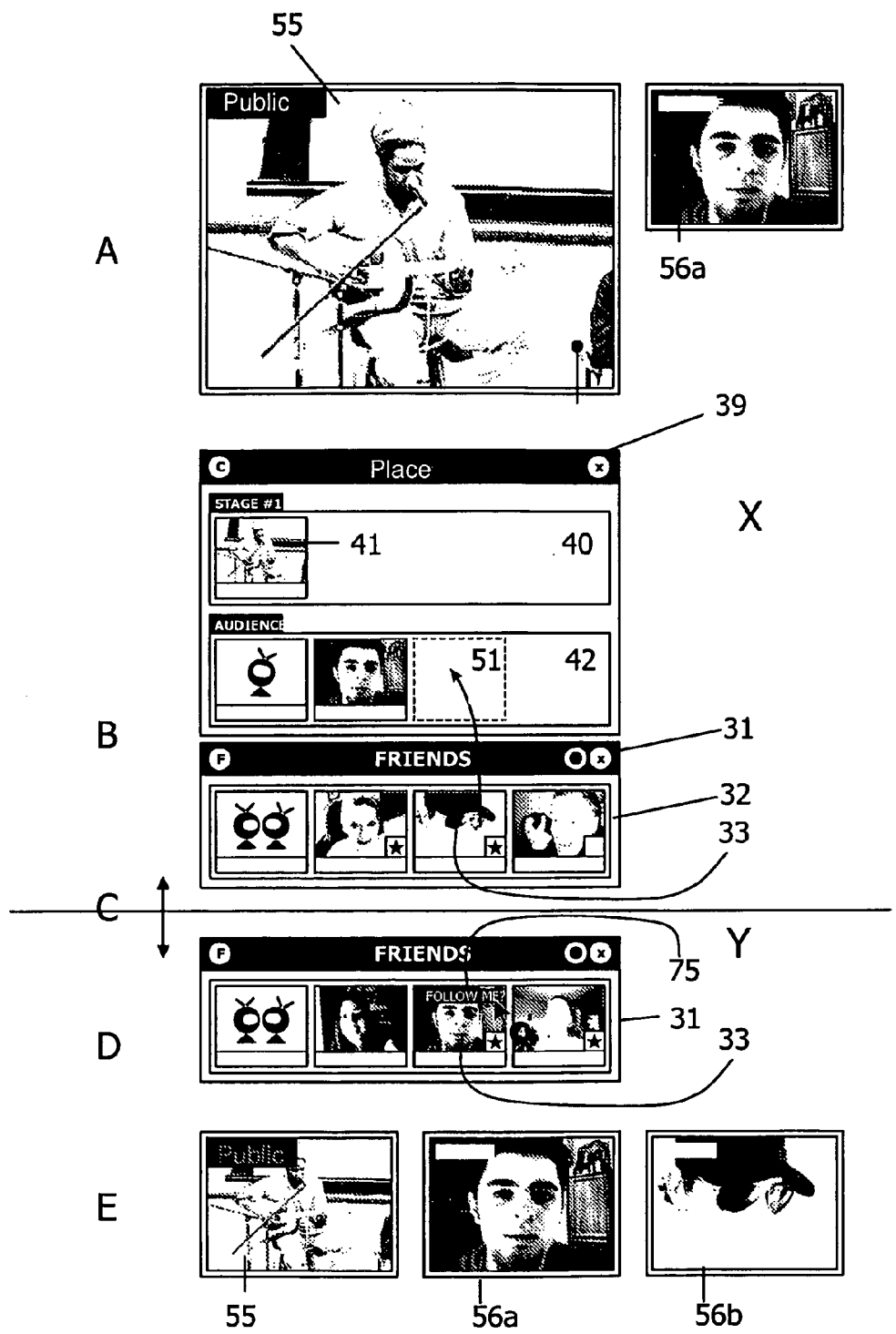

In the drawings:

FIG. 1 shows a schematic layer model of the communication process,

FIG. 1*a* shows an exemplary device configuration for a client-server architecture for executing the process, FIG. 2 shows a schematic representation of a pool principle underlying the process, FIG. 3*a* shows a pool scheme for a single-connect mode, FIG. 3*b* shows a pool scheme for two different multi-connect modes, FIG. 4*a* shows a first exemplary image processing function, FIG. 4*b* shows a second exemplary image processing function, FIG. 5*a* shows an exemplary display window for a single-connect in the multi-subscriber mode, FIG. 5*b* shows an exemplary panel for a text chat, FIG. 5*c* shows an exemplary profile panel, FIG. 6 shows an exemplary friends panel, FIG. 7*a* shows a first exemplary panel for a multi-connect mode, FIG. 7*b* shows a second exemplary panel for a multi-connect mode, FIG. 7*c* shows a third exemplary panel for a multi-connect mode, FIG. 8 shows an exemplary panel for a mixed multi-connect and single-mode with a main menu FIG. 9 shows an exemplary panel group for setting up and executing a single-connect mode, FIG. 10 shows an exemplary panel group for setting up and executing a multi-connect mode, FIG. 11 shows an exemplary representation of a subscriber event.

DETAILED DESCRIPTION OF VARIOUS EMBODIMENTS OF THE INVENTION

FIG. 1 shows an exemplary layer model underlying the communication process according to the invention. The communication network used for the process is typically the internet 1 with the tailor-made packet-switched communication protocol TCP/IP and UDP, respectively. A number of terminals 2, typically stationary or mobile personal computers, notebooks, but also web-compatible hand-held devices such as PDA or mobile phones communicate with a server 3. The functions of the server may be realized in part or wholly by a peer-to-peer network. The communication of the terminals 2 with the server 3 or the P2P network is expediently accomplished via interfaces and protocols, which have access to the used network protocols or are based on same. To this end, the terminals include a browser with the corresponding extensions, which are called plug-in. The server comprises means for operating a web server, corresponding programs for the functionalities described below and means for operating a database. If the arrangement is embodied as a peer-to-peer network, these functions are distributed in part or wholly over the computers involved in the network.

The web application executed by server 3 may be realized by both a standalone architecture and an integrated architecture.

The web applications underlying the process form part of server 3 or of a script interpreted by this server or of an application jointly executed by the P2P network. The implementation of this script or the P2P application is realized by the known script languages such as PHP, Perl, Python within the scope of so-called modules, servlets by using Java, or by Java server pages.

With respect to the implementation and functionality standards the process is operated as a so-called rich internet application, wherein the terminals 2 take over a part of the routines and scripts required for executing the process. These comprise in particular Java scripts, Java plugins, flashplayer animations, ActiveX plugins and the like extensions.

The rich internet applications on the client side are managed by one or more application servers, in particular by a Java Enterprise system.

The functions and programs executed on the server and in the terminals and in the P2P network, respectively, may be divided with regard to their grade of abstraction for the respective users and subscribers into several layers. A lowermost layer is formed by program means 4 for executing basic database operations. It includes components for storing and managing user data or multimedia user contents.

A link layer 5 on top of the same comprises means for executing communication processes between the server 3 and the terminals 2, or between the terminals in the case of the P2P network. This includes, for example, the logical connection setup and link disconnection between two or more selected terminals, a logical assignment between terminal and IP address, on the one hand, and subscriber names, on the other hand, and other means allowing higher abstraction levels to have access to the data flow between the terminals.

A subscriber layer 6 provides for a basic and minimum user interface for the subscribers operating the terminals. It comprises in particular providing means for setting up a subscriber profile, for editing a subscriber profile, for uploading or downloading contents and for operating web cam applications. The subscriber layer particularly also provides basic means for displaying websites with minimal functionalities.

Finally, a front end layer 7 is provided, which comprises means that allow an intuitive and comfortable user guidance and, specifically, generate a graphical user interface (GUI). Specifically, it allows to order, select and group other subscriber profiles per drag-and-drop features, or to assign other attributes to them, as will be shown by means of examples below.

FIG. 1a shows an exemplary device-related configuration of the server 3 which, in the present example, is provided as a distributed server architecture. This server architecture consists of an application server 3a and a web server 3e having common access to a subscriber database 3b. These comprise means for managing the subscriber profiles. As far as the software is concerned, application-specific programs for executing the process described herein are provided, which are based on the known database and program structures such as MySQL, a Java Enterprise server, an Apache Tomcat and an operating system suited for such servers, such as in particular Linux.

The communication operations are executed by one or more streaming servers 3c and application servers 3a, which include the program means necessary for such tasks, in particular Red5, Wowza Media Server or Flash Media as well as a Java Enterprise server (JBoss, GlassFish) in combination with an operating system advantageous for this purpose, e.g. Linux in the form of a Red Hat distribution.

A load balancing server 3d switches the communication between the servers 3a and 3c and the clients, i.e. the terminals 2, and simultaneously serves to balance the network load. The load balancing server expediently uses Linux Virtual Server LVS as program means and is based on the operating system Linux. The communication between the clients, i.e. the terminals 2, is realized in combination with the application servers 3a and the load balancing server 3d via the TCP/IP protocol, expediently in combination with XML. The communication between the terminals and the streaming servers applies protocols such as RTMP and RTMFP by using the flash video format.

The clients have the corresponding program means for representing, transmitting and receiving multimedia data. These are in particular shockwave flash files, flash player or comparable applications, a web browser and an operating system, e.g. Linux, MacOS or an operating system from the MS-Windows family.

All subscribers to the process form a total set referred to as subscriber pool, which may be subdivided by a number of subsets. FIG. 2 shows a schematic representation of this structure designated as "pool principle".

All subscribers in the process in progress as well as all subsets to be explained in more detail below and permanently existing transmission channels form the total pool of all subscribers, which is designated as main pool 10.

All subscribers shown by the differently designed circles in FIG. 2 classify themselves by their entries in their subscriber profile, by their subscriber behavior and their arbitrarily defined contacts to other subscribers. These classifications result in a number of subpools, which are formed as subsets of the main pool.

In a subpool, subscribers are logically grouped according to specific criteria. For example, a first subpool 11a is formed by subscribers 9a, who are connected to each other in a single-connect. A second subpool 11b for a multi-connect is formed by a "place", with one subscriber 9b designated as "actor" being in a one-to-many connect mode with other subscribers.

Also, several subpools may be nested. For example, an outer subpool 11c is formed by a subset of first subscribers, from which differs another subset of other subscribers who form an inner subpool 11d.

In FIG. 2 another isolated subpool 11e is shown, which includes subscribers 9e who are listed on a blacklist of undesired subscribers and are isolated, permanently or temporarily, from the other subscribers of the main pool. Moreover, also uncommitted subscribers 9f may be present in the main pool, who are either not assignable to any of the mentioned subpools or have established a contact to other subscribers of other subpools.

As soon as a subscriber forms part of a subpool, he is automatically in a group of possible connections to other subscribers, to whom he can have direct access in the event of a corresponding request. This kind of access is realized, for example, by a process for selecting another subscriber, which is referred to as "zapping".

For this zapping process preferences may be assigned. These preferences are defined in the subscriber profiles of each individual subscriber, where they are provided as so-called like and dislike tags and logically characterize a subset of the main pool, i.e. a subpool. The establishment of a communication between a subscriber and a second subscriber during the zapping process is performed in such a way that the first free connection with the requesting subscriber of the subpool, that is the most likely one to come into question, is activated.

The like and dislike tags are, as a rule, not permanently altered. By pre-indexing all possible partners, latencies are minimized. The adjustment of the subscriber profiles to each other, especially the comparison of the like/dislike tags for the zapping process, is performed by matching modules, which form part of the network layer 5 shown in the representation of FIG. 1.

The matching module has the task of evaluating the collected subscriber information (profiles, behavior of subscribers, voting), cataloging the subscribers/channels into corresponding subpools, as well as switching requesting subscribers to partners from the respectively matching subpool. To this end, especially information retrieval techniques are used. Expediently, the module is designed to be adaptive and can adapt the stored subscriber profiles to individual alterations of individual subscribers, especially to their behavior in the main pool or to their previously performed communication flows and processes.

Some basic communication modes shall be explained in more detail below. FIG. 3a shows, to this end, an exemplary single-connect in the subscriber pool, where a one-to-one communication is realized as an example. In this example, the communication between the subscribers is executed as so-called "media stream connect" in the form of audio, video and text between two subscribers by means of a web cam and a microphone or comparable audio/video sources. Two subscribers communicate directly with each other via a video/audio connection and/or text chat connection. The connection can be interrupted or changed at any time.

The switching in the single-connect mode is freely selectable by the subscribers. A first possibility is a random connection without preferences. The subscriber is connected to a random partner from the main pool. The connection is set up without preferences, as the subscriber has either not entered any like/dislike tags, WhoAmI tags into his profile, or has deactivated them.

In a random connection with preferences, a first subscriber is preferably connected to a random subscriber, who is located in a preferred group, i.e. a subpool, which is characterized by one or more of the following properties.

According to a first property, a hit rate in a preferred subpool is determined between the like tags of a first subscriber and a matching self-description and/or personal data of a second subscriber. Alternatively, also the correspondence between identical like or dislike tags can be determined. Another possibility of a preference setting is a ranking of the similarity of the utilization behavior of both subscribers, if the utilization habits in using the random selection are similar. Dislike tags inputted by the subscriber can exclude a connection to subscribers by related like and/or description tags.

Also, it is possible to make a note of a number of subscribers in a so-called friends panel of the own subscriber profile, and to directly contact them by clicking on their icon in the friends panel. If the desired partner is presently engaged, the requesting subscriber may be parked in a waiting loop. The request is signaled to the partner by a call waiting routine, which is symbolized, for example, by a blinking icon or the like. As soon as the same is acknowledged, the connection is set up.

FIG. 3b symbolizes two different kinds of a multi-connect mode, in which a communication is realized according to the one-to-many and the many-to-one type. In this mode a connection is established between one or more subscribers referred to as "actors" and several subscribers referred to as "viewers". The one or several actors stream their media stream (by means of a web cam/microphone or comparable audio/video sources) to an unlimited number of viewers. The left image in FIG. 3b corresponds here substantially to the subpool 11b in FIG. 2. In this multi-connect mode the actor 9b is connected to several subscribers 9 and provides each of them with a multimedia stream. In the right image of FIG. 3b two actors 9b are provided, which jointly supply the subscribers 9 with one stream each.

Multi-connect components are, as was mentioned before, actors and viewers who are provided as special subscriber categories. An actor is a subscriber who makes his media stream accessible to a broad public, that is, to several subscribers simultaneously or in parallel. A viewer is a subscriber who receives the media stream from the actor actively and passively. An actor may simultaneously be a viewer of another actor.

To this end, an actor utilizes a place. A place in terms of the process explained herein is a transmit place in the subscriber pool, which may be subject to a fee. Basically, an actor can freely denominate his place by a link tag. The place is then generally available under this link tag, regardless of whether it currently contains one or more streams. Streams can be announced by the actor in the place by means of a multi-address message in the form of a virtual flyer. The multi-address message contains parameters, e.g. a name of the actor, an online time prior to the beginning of the stream and a freely designed waiting screen.

If an actor opens a place, he may define a name (link tag) for the same. Under this link tag his public media stream is directly accessible in the communication network. Each place is associated with at least one subpool, called stage, in which—as shown—also several actors may be active. They are graphically represented in the stage panel by their icons. All actors within the stage subpool are visible to all viewers of the place. The stage subpool forms in a way a virtual stage.

Several actors may stream on one place to several viewers individually or as composite split-screen. The participating actors of a place are graphically represented in a stage panel by their icon and may be directly selected or contacted by the viewer, provided that this is approved and the actor is not engaged. Here, a change takes place from a split-screen representation into a full-screen representation, and a pseudo one-to-one connect is established. A maximum number of actors are defined as parameters for the subpool, either by the actors themselves or by a system administrator. Moreover, it is determined whether viewers may join the subpool and, thus, enter the stage.

Once the setup of a place is completed, a start or waiting screen appears as a virtual curtain, which may be freely designed by means of a text input, a start image, a flyer or any other design means. The place may be opened by the actor per mouse click, and the stream transfer can be started. Places use curtains as wild-cards and display for announcements if they are currently not sending streams.

The second subpool of a place consisting of at least one viewer is referred to as audience. It comprises the set of all subscribers participating as viewers in a multi-connect.

Actors and viewers see subscribers, who are part of the audience pool, in an audience panel of the place graphically represented by their icon. Unknown subscribers are displayed by a wild-card which, moreover, indicates the number thereof. Audio signals of all viewers are publicly audible as mixdown, provided that the actor approves thereof.

The viewers may be divided into different viewer types. An active viewer may be taken onto the stage by the actor or enter the stage himself. His icon is dragged from the audience panel to the stage panel. In this case he also becomes an actor, part of the place, and can be publicly viewed and heard.

A passive viewer can receive the happening on the place of the actor, but does not transmit himself. He cannot communicate with the actor.

A communication with/within the audience is possible as well. Subscribers who have been set, as described above, as friends can be contacted directly by clicking on their icon, unknown viewers by operating a zap button if the focus is on the partner screen (56a, FIG. 8), and by operating a wild-card button or a similar control mechanism on the side of the subscriber or the server.

The contact possibilities within the audience thereby substantially correspond to those of the single-connect already described. Random connections without preferences, random connections according to preferences and connections to known users, the so-called friends, are possible. In addition, viewers can communicate with the actor like in the single-connect mode without being publicly visible.

The actor can limit the access to the audience pool by means of a password, electronic tickets and similar processes. Moreover, he can set of his own a number of (access) parameters, such as a maximum number of viewers, only friends as viewers or only viewers with certain tags.

Within the place, each viewer can assess the current actor by means of a voting button. In the simplest case, voting buttons for choosing between "good" or "bad", that is, "thumb up/thumb down" are provided. The average of the positive/negative votings of all associated actors results in the overall assessment of a place.

The voting results influence the parameters of other features, such as in particular "Best Of" lists or a ranking within preferred subpools.

For activating the place mode, the subscriber presses a "public" button and thus switches to the multi-connect mode. By this, a stage and audience panel are opened. The subscriber now acting as actor configures stage and audience parameters. The place can now be opened to the audience and is ready for the start. The actor clicks on a curtain button in order to start the place and open it for other subscribers.

Below, some indexing and addressing means shall be described in more detail, which can be added to the subscriber profiles. They form a part of the subscriber layer 6 and the front end layer 7 shown in FIG. 1.

A first part of the subscriber profile is formed by so-called tags. These are keywords that help to describe the user and his interests. They are used to guarantee a best possible helpful switching between subscribers having the same interests. Dislike tags are freely definable keywords for describing antipathies ("I don't like . . . ") of a subscriber. Like tags are freely definable keywords for describing sympathies ("I like . . . ") of a subscriber. WhoAmI tags include self-description keywords ("I am . . . ") of the subscriber. The subscribers input tags about their person in their profile.

The actual self-portrayal and information platform as well as the setting range for connection preferences is formed by the subscriber profile, which the subscriber substantially manages himself. It particularly offers a collection place for tags. The subscriber profile makes it possible to the subscribers to make information about themselves available to other users, to input connection preferences and to represent themselves. The information inputted into the profile are available to the system as tags for indexing the subscriber in question.

As regards the content, the subscriber profiles can substantially be subdivided into two domains. A first domain serves the information on or the self-portrayal of the subscriber. It contains a name, which may also be a nickname, a date of birth, the sex, details about the origin, in particular country/province/place of the subscriber and details as to subscriber's language. These can particularly be selected as multiple choice options. Moreover, WhoAmI tags, like tags and dislike tags with categorized and freely definable self-description keywords are provided. By means of the "Who am I" tag ("I am . . . ") the user can describe himself in free keywords. Like tags can relate, for example, to the favorite music, the favorite meal or the like data of the subscriber, while dislike tags include corresponding details about antipathies.

A possible component of the subscriber profile is formed by jingles. To this end, the subscriber can upload short sound files, which are streamed upon each new connection with the respective partner, provided that the same has activated "receive jingle". Also, slogans are possible, wherein subscribers can define comments of any kind (form on the day, introductory slogans, mottoes etc.). These are displayed to the dialog partner in each new communication.

Also, so-called mashups are possible, wherein the subscriber can incorporate widgets/services of external providers into his profile, such as own audio play lists from Radioblogclub, LastFM and similar other services Moreover, places and subscribers, respectively, can be contacted either by direct links on a website of the process or by linked widgets. The widgets are small applications that may be incorporated into other internet platforms and portals.

Thus, they allow the direct access to certain subscriber profiles or make it possible to switch oneself into the process flow from other portals in a "live" manner. Thus, the process is virtually extended and linked to other internet services and portals, e.g. MySpace or Facebook.

The subscriber can define preferences in the form of the like tags ("I like . . . ") in the form of freely definable keywords for describing sympathies, and dislike tags ("I don't like . . . ") in the form of freely definable keywords for describing antipathies.

Moreover, link tags may form part of a subscriber profile. Link tags are links which are assigned to uniquely specified places or subscribers. Link tags have to be unique and can be assigned only once. Duplications are not possible. In combination with URLs they function like common hyperlinks. Contents can be accessed directly from outside the application. Link tags may be inputted into the link tag field (similar to the address line of a browser), or they may be graphically represented by corresponding icons. If link tags are used in the text chat, they can be directly activated by clicking on them.

A particularly important component of the subscriber profile is offered by features for operating or establishing a social network. A first feature offers a so-called "friends" function.

By using the friends function subscribers have the possibility to offer "friendship" to connected dialog partners and, upon acknowledgment, to directly store them as friends. Expediently, friends of each subscriber are stored persistently on the server or in a peer-to-peer network and are represented by thumbnails, generated from the video stream of the "friend" or an upload of a digital photograph, in a "friends panel" of the subscriber. If a friend is currently online, this is displayed by a status change of his icon (e.g. by an additional symbol or change in color).

By clicking on their icon, friends can be contacted in the friends panel directly. If the desired partner is currently engaged, the requesting subscriber is in a waiting loop. The request is communicated to the partner by "call waiting" (blinking icon or the like). As soon as he acknowledges, the connection is set up.

The subscribers can invite their respective friends to places, for example, by dragging their icon into an audience panel of a place in which they are currently themselves. In this case, the corresponding friend receives a request from the sender whether he would like to take part in the event. If he acknowledges the same, he will be directly transferred to the place and can contact him within the audience. This drag and drop function forms a part of the front end layer 7 of the layer model shown in FIG. 1.

Moreover, the subscribers can exchange during a communication different objects, for example, images, sounds, texts etc. in file format, by dragging representative icons of these objects into the screen of the partner by means of the drag and drop function. The icons are displayed in a suitcase panel of the subscriber profile.

The data exchange between the subscribers is accomplished by so-called PZ objects. These are containers for exchanging data within the process. These containers may contain files, widgets and plugins. In addition to the actual file content the PZ objects contain meta data that include certain rights and application possibilities. These control the desired application possibilities and limit them in case of need. Meta data contained in a PZ object can only be altered by the author, the subscriber who generated it.

Examples of rights and settings related to the PZ object are, for example, transfer rights or copying rights for the subscribers, which can be set by the object generator. A subscriber can determine, for example, that the PZ object may be transferred only once, while the transferring subscriber does not keep a copy thereof. Also, it can be determined that the receiver must not or cannot transfer the PZ object to other persons.

Moreover, other multiple settings for the PZ object may be defined. That is, the object may be present only once, while the transferring subscriber does not keep a copy and the receiver may pass the object on to others. It can be determined that the PZ object may only be transferred n times, or that it deletes itself after a certain time t or after a one-time execution. Moreover, it is also possible to assign a password to the PZ object. It may also be determined that the object can only be transferred in exchange for another one.

In order to extend the functionalities of the subscriber profiles also widgets may be provided. These are small Internet applications that may serve, among others, to incorporate or trigger functionalities of diverse internet services, such as MySpace, GoogleEarth, Flickr. PZ plugins extend the functionality and can be generated by the subscribers themselves. To this end, appropriate software means such as Actionscript or Java are suited. They offer additional functions such as games, music player etc.

In the suitcase panel already mentioned above subscribers can collect and organize their PZ objects and generate own PZ objects and/or define or alter the rights and functionalities thereof.

The subscribers can make music played locally on their computer audible to all connected clients. The source for this purpose is irrelevant as long as the music runs over the local sound card. To this end, the digital audio signal is picked off and streamed to the connected client(s). The level of the microphone and the external audio source can be adjusted by a controller.

Subscribers in the direct connect (single-/multi-connect) have different online games to choose from. The media stream of each subscriber is included in the game.

FIGS. 4a and 4b show examples in this regard. FIG. 4a shows a subscriber in a media stream displayed in window 13, who is currently connected to another subscriber displayed in a window 14. The subscriber displayed in window 14 now has the possibility to draw ornaments 13a into window 13 and to thereby modify the media stream displayed therein by a paint process.

In FIG. 4b the face of the subscriber displayed in window 15 is distorted and, thus, made the object of a morph program with the distortions 15a possible within this scope.

If at least two subscribers are connected with each other in a single-connect, a so-called Join Me function can be activated, wherein one of the subscribers takes another virtually "by the hand". Both subscribers here perform the same virtual movement within the network.

The Join Me function can be triggered, for example, by both subscribers clicking on a Join Me button. As soon as one of the subscribers performs an action, e.g. a zapping process, the other subscriber automatically performs this process at the same time. The change of a connect by the one subscriber is automatically transferred to the other subscriber. The Join Me function remains active until the corresponding button is clicked on a second time, thereby releasing the function.

Expediently, means for executing safety functions are provided. A first means are blacklists. They offer a blocking function for undesired communication subscribers.

The blacklist function can be used by the subscriber if he rejects an optional subscriber for various reasons and does not want to communicate with him. By pressing a blacklist button in the own subscriber profile or that of the corresponding communication partner the current connection is terminated, and the corresponding partner is stored in a personal list of undesired connects. Such a blacklist managed by the individual subscriber is a local blacklist. If a subscriber appears on many of such local blacklists, a certain pattern from such entries is created for the corresponding subscriber stored on the local blacklists. If a certain threshold is reached, the subscriber in question is set onto a global negative list or global blacklist. This entails that the subscriber in question is logically assigned to subpool 11e shown in FIG. 2. Subscribers in this subpool can communicate only with each other within this subpool. Thus, it is prevented that automatic applications such as so-called spam bots, i.e. automatic spam clients, can identify the blocking as such.

Expediently, the blocking includes details and data about the identity of the used internet access and computer of the blocked subscriber. This particularly includes reading out the IP address, storing flash cookies and similar processes. The aim thereof resides in rendering new logins and, thus, identity changes of blocked subscribers more difficult.

Another safety feature is formed by a report function if the users are under age. As soon as a subscriber discovers an obviously minor user or the subscriber profile of an obviously minor user, he can report the same to be under age by means of a child report function which is triggered, for example, by clicking on a button. If a so identified minor is flagged in this manner by several subscribers, a unique pattern is generated, which causes the system to block the corresponding client.

In addition to the above-described functions other functionalities may be provided. A first one of those functions relates to a storage function for streams, by means of which the subscriber can record and store a communication in progress. The current video/audio stream can be locally stored by the subscriber as a video file. To this end, substantially two possibilities are provided:

When recording a single-connect, subscribers are able to locally store, and thus record, a communication in progress as a split-screen video file with both subscribers, on the condition that each of the subscribers approves of the recording and clicks on a corresponding button in the profile.

When recording the happening in a place in the multi-connect mode, the subscribers can locally store the happening as a split-screen video file or individual actors as a full-screen video file, on the condition that the actor/place owner permits same in the defaults.

Below, some elements of the graphical user interface for subscribers shall be explained by means of examples. FIG. 5a shows an exemplary appearance of a video chat in the single-connect mode on the left and as split-screen in the multi-connect mode on the right.

In the single-connect mode, the subscriber is displayed a so-called partner screen 16 showing the image of his communication partner taken, for example, by a web cam. The partner screen comprises a text field 17, which may be filled in with a slogan editable by one of the two subscribers. In the simplest case the text field includes the name of the respective communication partner. By means of a zoom frame 18 the partner screen can be enlarged, as desired, or moved to an optional location on the screen. A user status indication "private"/"public" 19 in the upper corner on the left of the partner screen signalizes that the connection is active and the communication is executed.

In the split-screen shown in FIG. 5a on the right several actor screens 20 are contained within the zoom frame 18. Depending on the user status, these screens may each contain the text field 17 and the "private"/"public" indication 19. The entire split-screen can be scaled by the zoom frame. Individual actor screens may be cut out of the split-screen and converted into a partner screen, e.g. by a double click.

FIG. 5b shows an exemplary text chat panel 21. The text chat panel may be placed as a single window at an optional location of the screen or be integrated into the structure of a more comprehensive window. The text chat panel includes a text dialog field 22 for reading the messages written by the respective communication partner, and a text input field 23 for inputting own messages to the communication partner.

FIG. 5c shows an exemplary profile panel 24. The profile panel includes a field 25 with basic personal data, e.g. name, date of birth, age, residence etc. in combination with a profile image 26. By means of a tab 26a another field can be opened, in which, for saving space, additional data of the subscriber are indicated. The profile panel includes a tag field 27. This tag field includes the above-described tags. These are, in particular, the WhoAmI tags 27a, the like tags 27b and the dislike tags 27c. A slogan field 28 and a jingle field 28a accessible by a tab include the aforementioned slogan characteristic of the subscriber and the jingle uploaded by the subscriber. A link field 29 includes the link tags set by the subscriber. An image field 30 opens a gallery containing uploaded personal subscriber pictures.

FIG. 6 shows an exemplary friends panel 31 in connection with an exemplary process of establishing a friend contact. The friends panel 31 includes a gallery 32 of subscribers already registered as friends, who appear therein with their profile images. These include text fields 33 with their names or nicknames, as well as markers 34 for displaying an offline/online status and markers 35 for displaying an active/inactive status of the respective subscriber. In addition, a button 36 for offering/acknowledging a friends contact is provided in the friends panel. Alternatively or additionally, this button may be integrated at another location of the user interface.

Establishing a friends contact is accomplished by an initiating subscriber 37 during the communication with a second subscriber by clicking on, for example, button 36 in the friends panel or an additional/alternative button for offering his friendship. A dialog then appears in the partner screen 16, which offers friendship to the second subscriber. If the second subscriber acknowledges the request, the friends contact is established, and both subscribers can contact each other directly in the future. At the moment of acknowledging the friends contact, each subscriber can additionally generate a snapshot of the current web cam image. These snapshots are exchanged between the subscribers and, if desired, can be processed by them interactively, i.e. they can in particular be commented. Thus, the snapshots capture in a way the moment when the friends contact was concluded.

Moreover, it is possible that a subscriber contacts a possible user via e-mail or another communications service and invites him to use the herein described process. This function is referred to as direct link for inviting a friend. In particular, this is accomplished by the subscriber transmitting a hyperlink, a URL or the like web address to the potential user, on the basis of which a start and installation of the process components on his terminal are possible. The inviting subscriber then appears as the first friend of the user now newly introduced into the process. He becomes his first preferred contact.

Also, it is possible to set direct links in the form of bookmarks. These fulfill the same function as other direct links. They relate to single- and multi-connects and can be generated by the subscriber during an active connection. Expediently, bookmarks for single-connects require the approval of the respective partner to whom the link refers. They can be transferred, for example, in the form of the aforementioned PZ objects or used like common hyperlinks outside the people zapping application.

Furthermore, short text messages and notes can be left by a notify function to the stored contacts of a subscriber. The message can be retrieved by the receiving subscriber by clicking, for example, on the icon of the sender.

FIGS. 7a, 7b and 7c show exemplary place panels. FIG. 7a shows a place panel 39 in a simplest embodiment. The place panel 39 includes a stage field 40. The stage field includes a profile image 41 of a subscriber who acts as actor according to the above description. Moreover, an audience field 42 is shown, in which several subscribers are displayed with their profile images in a symbol-like manner. In this example, a random and anonymous guest subscriber 43, a registered subscriber 44 and a friends subscriber 45 according to the above description are shown. The latter is identified by the corresponding friends icon 46.

FIG. 7b shows a place panel 47 for an access to several subordinate places with several stages. The access to several subordinate places is allowed by a place button 48 which the subscriber may click on. After clicking on a place button, the corresponding stage field 40 and the associated audience field 42 are opened. In this example, the stage field 40 includes more than one actor. The actor 41 was joined by another actor 41b, who is identified by friends icon 46.

In this example, the place includes several stages. A stage tab 49 allows the access to other stages of the currently selected place.

FIG. 7c shows a version of a place panel 50, in which the subscribers shown in the audience field are categorized. In the actor field shown herein wild-cards 51 and 52 for other potential actors are provided. The audience field 42 is sub-divided into an audience field 53 for active subscribers and into an audience field 54 for passive subscribers of the audience of the place, that is, the currently active stages. Different rights to have access to or participate in the communication processes linked with the place are connected therewith. The subscribers shown in the active audience field 53 can, for example, be moved to the actor field onto one of the wild-cards 51 and 52 by the drag and drop function and become actors themselves. For the subscribers in the passive audience field 54 this is then impossible. In this example, too, the subscribers in the audience fields are divided into guest subscribers, registered subscribers and friends subscribers.

An access-limiting complement to the place panel may be password and/or ticket functions. A password function allows the access to the corresponding place only by knowing a password, which is given out to a special subscriber circle only. The ticket function allows an access to the corresponding place, provided that the subscriber has made a payment or acted otherwise. A ticket function can also be, for example, that a subscriber is only granted access if he "brings along" a certain number of own friends, i.e. if he has made a successful request to enter the place.

FIG. 8 shows an exemplary container for a mixed multi-connect and single-mode with a main menu which, in the following example, is designed as a menu bar freely displaceable on the screen.

This container serves to represent, control and execute the actual multimedia communication, thus forming the "screen" presented to the subscriber and on which other subscribers and actors are shown to him. The container comprises a screen 55 for a communication in the multi-connect mode, which can be initialized, for example, by means of the panels shown in FIGS. 7a to 7c, and two screens 56a and 56b each for a communication in the single-connect mode running in parallel. The thus provided split-screen display may be converted into a full-screen display at any time. To this end, a double click on the screen 55 or on one of the two screens 56a or 56b is sufficient. By means of a ZAP button 57 it is possible to switch between the individual communication partners. This is accomplished, for example, such that, by clicking on a screen (in this example, screen 55 and screen 56a), the focus of the zap button is placed onto the respective connection. If the user now operates the zap button, the connection to the focused partner is disconnected and a connection to a new partner is established. The volume of each individual screen can be controlled individually or set to mute.

A main menu 58 serves a detailed user guidance, a management of the above-mentioned panels and the generation of acknowledgment reactions. This menu can be freely positioned on the screen by moving the mouse and comprises some buttons that can be operated by means of a mouse click. The main menu may be designed in different forms.

The main menu particularly includes an FS button 59 for switching to a full-screen mode, a ZAP button 60 for the aforementioned switching between the respective screens, a volume button 61 for controlling the volume, a help button 62 for activating an interactive help function and for invoking tools, a profile button 63 for unhiding and hiding the own profile panel or the profile panel of the respective other subscriber, a text chat button 64 for unhiding and hiding or activating and deactivating the text chat panel. Further provided are a friends button 65 for activating and deactivating the friends panel, a place button 66 for activating and deactivating the place panel and a games button 67 for activating and deactivating a games panel, e.g. of the paint and morphing functions shown in FIGS. 4a and 4b.

Moreover, the main menu comprises means for a subscriber interaction taking place in parallel with the audio-visual communication. These are, in particular, a positive voting button 68 and a negative voting button 69, by means of which the subscriber can decide whether he considers the happening on the place to be good or bad. A friendship button 70 serves to trigger the above-described process for establishing a friends relationship between subscribers. A blacklist button 71 adds a selected subscriber to a mentioned local and/or global blacklist. A child report button 72 reports a subscriber who is obviously under age to a system administrator. Finally, a close button 73 is provided, by means of which the menu bar can be closed or hidden.

In addition, a pause function can be provided. By clicking on a corresponding button, the subscriber can pause and hold the current connection, wherein the camera is deactivated. If his partner disconnects the connection during the pause state, no new connection to the paused subscriber is established until he releases the pause function. However, he can receive messages or react on a call waiting from a friend. A button for the Join Me functionality may also be integrated in the main menu.

Below, some expedient combinations of the aforementioned panels for the single- and multi-connect mode are described by means of examples. Expediently, these are opened simultaneously and are distributed in a clearly laid out arrangement on the screen of the terminal of the respective subscriber. FIG. 9 shows an exemplary setup for a single-connect, FIG. 10 for a multi-connect.

The setup shown in FIG. 9 comprises the partner screen 16 with the zoom frame 18 and a smaller monitor screen 16a for reproducing the subscriber in the detecting range of his own web cam or any other video source. The monitor screen serves to control his own web cam or video image. It likewise comprises a zoom frame and can accordingly be adjusted to a size appearing suitable to the subscriber.

Near the partner and monitor screen there are located the text chat panel 21, including the corresponding fields 22 and 23, and the friends panel 31 with the subscribers defined as friends. Finally, the zap button 57 is provided, by means of which the communication with the current subscriber can be terminated and a communication with another subscriber can be started. As was described above, this communication may be switched randomly or be generated by clicking on a subscriber in the friends panel or by a search process. Also a changeover to the multi-connect mode may be accompanied by the same.

The setup shown in FIG. 10 for the multi-connect mode comprises the split-screen described in FIG. 8 consisting of screens 55 and 56a and 56b. One of the screens 56a or 56b may be designed as a monitor screen. The split-screen is associated with the above-described ZAP button 57, which allows a switching between the respective communication partners. This arrangement is supplemented with the text chat panel 21, including the text dialog field 22 and the text input field 23. Also, several text chat panels may be opened, each of which allow an own text chat with an own subscriber. Another component is formed by the above-mentioned place panel 39 with the stage field 40 and the audience field 42. The setup is supplemented by the friends panel 31 including the gallery 32 and the corresponding above-described features and functionalities.

FIG. 11 shows an example of the drag and drop functionality between the explained panels by using the example of a subscriber event. A first subscriber X transmits an invitation for a place to another subscriber Y, wherein the second subscriber Y is informed by subscriber X about a place and newly joins the audience pool by following the information transmitted by subscriber X.

In step A, subscriber X has opened a screen 55, in which the happening on the place of an actor can be traced. The subscriber sees himself in his monitor screen 56a. As described, the place is assigned a place panel 39 with the stage field 40 and the audience field 42, where the subscriber X in question is listed. Additionally, subscriber X has opened his friends panel 31, in the gallery 32 of which subscriber Y is listed by his profile image 33.

In a step B, subscriber X now drags by means of a typical drag and drop process this profile image 33 from the gallery 32 of the friends panel into the wild-card space 51 of the audience field in his place panel 39.

Based on the foregoing, a signal transmission between subscriber X and subscriber Y is performed in a step C, which makes subscriber Y aware of this drag and drop process. This is done by a corresponding indication in the friends panel 31 of subscriber Y. Subscriber X, in turn, is listed in his gallery 32 with his profile image 33. As a result of the drag and drop process performed by subscriber X a Follow Me marker 75 appears on the profile image 33 of subscriber X in the friends gallery 32 of subscriber Y in a step D, which displays to subscriber Y that subscriber X has invited him to the place found by him.

By means of an acknowledgment, e.g. a double click on the marker 75, screen 55 of subscriber Y is now equally opened with a corresponding monitor screen in a step E. Subscriber Y, too, is now a part of the audience pool of the corresponding actor, just like subscriber X.

In a corresponding manner, a plurality of such interactions can be carried out both between the subscribers among each other and between the actor and the subscribers. Thus, it is particularly possible to exclude a subscriber from the place by dragging his profile image out of the audience field with the drag and drop function.

Within the limits of the inventive concept, the process described can be embodied with other features and embodiments. Other embodiments are defined in the dependent claims.

Important terms used in the specification shall be briefly explained and defined once more below:

Account: describes the identity of a subscriber in the PZ network. The account includes login data, contacts (friends), the subscriber profile, data relevant for switching and management, and other entries.

Actor: Subscriber making his media stream accessible to a broad public, the so-called viewers. An actor is characterized by a "public" user status display in his screen.

Audience: The set of all subscribers taking part as viewers in a multi-connect.

Audiostreaming: Streaming of microphone-independent audio sources between subscribers in the PZ network.

Blacklist: List of blocked (undesired) subscribers.

Place: Transmit place being permanently accessible and recordable with 1-n shows.

Childlist: System-internal list for blocking minors. Subscribers have the possibility to report the use by children to the system. Clients having thus been reported are blocked.

Connect: Connection of subscribers within the process.

Container: Part of a graphical user interface, container for associated elements.

Curtain: Waiting screen prior to the beginning of a show.

Dislike tags: Freely definable keywords for describing antipathies ("I don't like . . . ").

Focus: Selection of certain GUI areas for user actions

Friend: Stored contact of a subscriber

Friends panel: Collection of all stored contacts (friends) of a subscriber.

Global blacklist: List of all subscribers, who are continuously blocked by a specific subscriber number n.

Index: Data structure for the high-performance calculation of the relevance of a partner to be switched.

Information retrieval: Information retrieval (IR) is an interdisciplinary science (mathematics, information technology, linguistics) and subdomain of the information-processing technologies, which combines different technologies for the search for/recovery of information. The information need and the information to be processed are characterized by the following characteristics:
vagueness: diffuse, non-formalizable information need (natural language) of the user
uncertainty: the processing system has no knowledge of the relationship of the data/information as regards the content All IR systems have the use of an index in common, in which the data available for the search are represented as the result of the information preprocessing and reduction. This allows an efficient search.

Jingle: Short audio file freely determinable by the subscriber, which is played on the side of the communication partner at every new contact. It forms a part of the self-portrayal.

Local blacklist: List of all subscribers, who are continuously blocked by a subscriber.

Like tags: Freely definable keywords for describing sympathies ("I like . . . ").

Link tag: Addressing tag for selecting certain partners and contents (channels, shows) directly.

Main pool: Totality of all subscribers, channels and shows currently online in the PZ network.

Matching module: PZ system component.

Tasks:
assessment of the collected subscriber information (profiles, subscriber behavior, voting)
cataloging of the subscribers/channels/shows in corresponding subpools
connection of requesting subscribers with the respectively matching subpool Media stream: Generic term for video, audio and text streams.

Multi-connect: Media stream accessible to several users.

In the multi-connect one or more subscribers appear as actor(s) ("organizer"). A maximally unlimited number of subscribers can receive the corresponding media stream.

Nickname: Freely definable name of a subscriber, which can only be assigned once.

Partner: Active communication partner in the network.

Partner screen: Screen of the current dialog partner in a one-to-one connect.

People Zinc: Online magazine for subscribers. It contains an event calendar for shows within the PZ system, editorial contributions and advertising spaces for PZ channels.

Pool: Set of a specific subscriber group.

Profile: Self-portrayal and information platform for subscribers.

Domain for setting connection preferences.

Collection form for personal tags.

PZ client: PZ application on the client side. It controls all local tasks of the PZ system on the subscriber side. (Receipt and transmission of media streams, collecting subscriber data, management of connects and stored partners on the subscriber side).

PZ flyer: Digital advertising flyer for shows.

PZ games: Online games available to PZ subscribers during a connect.

Ranking: Rating of the usefulness of a connect.

It results from the global vote and/or the relevance of existing tags with regard to a subscriber inquiry.

Slogan: self-portrayal text defined by the subscriber, which is displayed to any contact.

Stage: Subpool consisting of 1-n transmitters, who stream in a place individually or as composite split-screen to m viewers.

Subpool: Defined subset of the main pool.

Tag: Keywords helping to describe the user and his interests.

They are used to guarantee a possibly helpful switching between subscribers having similar interests.

Text chat: Communication by real time text messages.

Viewer: PZ subscriber actively and passively participating in a place.

Vote: Result of the voting. The local vote only considers the user who participates in the voting. The global vote designates the ultimate ranking of the connect.

Voting: Process of evaluating a partner.

WHOAMI tags: Keywords used by a PZ subscriber to describe himself.

Zapping: Disconnecting the contact in progress and establishing a new connection.

LIST OF REFERENCE NUMBERS 1 internet
2 terminal
3 server 3a application server
3b subscriber database
3c streaming server
3d load balancing server
3e web server
4 program means for database operation
5 link layer
6 subscriber layer
7 front end layer
9a single-connect subscriber
9b subscriber in the one-to-many connect mode
9e isolated subscriber
9f uncommitted subscriber
10 main pool
11a single-connect subpool
11b multi-connect subpool
11c outer subpool
11d inner subpool
11e isolated subpool
13 window for media stream
13a paint ornaments
15 window for media stream
15a morph distortions
16 partner screen
16a monitor screen
17 text field
18 zoom frame
19 public symbol
20 actor screen
21 text chat panel
22 text dialog field
23 text input field
24 profile panel
25 field for personal data
26 profile image
26a tab
27 tag field
27a WhoAmI tags
27b like tags
27c dislike tags
28 slogan field
28a jingle field
29 link field
30 image field with gallery
31 friends panel
32 friends gallery
33 text field
34 offline/online marker
35 active/inactive marker
36 friends contact button
37 initiating subscriber
38 friends symbol
38a added friends contact
39 place panel
40 stage field
41 profile image, actor
41b profile image, other actor
42 audience field
43 guest subscriber, anonymous
44 subscriber, registered
45 friends subscriber
46 friends icon
47 place panel for several stages
48 place button
49 stage tab
50 place panel with categorized audience
51 wild-card
52 additional wild-card
53 audience field, active subscriber
54 audience field, passive subscriber
55 screen for multi-connect mode
56a first single-connect screen
56b second single-connect screen
57 ZAP button
58 menu bar
59 full screen button
60 reduced ZAP button
61 volume button
62 help button
63 profile button
64 text chat button
65 friends button
66 place button
67 games button
68 voting button, positive
69 voting button, negative
70 friendship button
71 blacklist button
72 childreport button
73 close button
75 Follow-Me marker

The invention claimed is:

1. A method for executing a multimedia communication, in particular at least one of a video, audio or text chat, between a totality of terminals (2) arranged in a communication network (1), which communication is based on a network protocol, in particular at least one of TCP/IP or UDP, wherein:
at least one subscriber generates a personalized user account in the form of a virtual subscriber profile on a server (3) or in a peer-to-peer network, wherein, by setting up the virtual subscriber profile, the multimedia communication is established at each of the terminals:
via the subscriber profile a mode of a subscriber selection preceding the communication, at least one of a communication type or a number of communication links to one of the terminals or the type of data transmission employed for the communication are freely defined;
the subscriber selection mode includes a random process for setting up a communication link between a selecting terminal of a first subscriber profile to at least another terminal of a random subscriber profile; and
the subscriber selection mode includes an activatable call procedure for establishing a communication link between the selecting terminal of the first subscriber profile and at least one other terminal of a subscriber profile stored in a selection list, wherein these subscribers form a plurality of at least one of an open and a closed subscriber sub-pool, whereby all subscribers in the procedure form a total set referred to as a subscriber pool, which subscriber pool may be subdivided into a number of the subscriber sub-pools, whereby all subscribers are classified by entries within their respective subscriber profiles and arbitrarily defined contacts to other subscribers, and whereby the subscriber classifications result in the number of sub-pools, which are formed as subsets of the larger subscriber pool.

2. The method according to claim 1, wherein the subscriber selection mode includes an activatable search process for establishing a communication link between the selecting terminal of the first subscriber profile and at least one other terminal of a subscriber profile which is determined by at least one of inputting search parameters or an analysis of similarity parameters on the system side.

3. The method according to claim 1, wherein the subscriber selection mode includes an activatable blocking function for at least one of avoiding or rejecting a communication request through the selecting terminal of the first subscriber profile from at least one other terminal of a subscriber profile stored in a blacklist.

4. The method according to claim 3, wherein for each of the terminals there is provided at least one of an own, freely alterable selection list or blacklist which is defined by at least one subscriber profile.

5. The method according to claim 1, wherein the setup of the subscriber profile allows that the type of the current communication be switched at each of the terminals between a one-to-one type, a one-to-many type, a many-to-one type and a many-to-many type.

6. The method according to claim 5, wherein the setup of the subscriber profile allows during the execution of a communication between a first terminal and a second terminal according to the one-to-one type the execution of a communication in a pseudo one-to-one type, wherein at least one other parallel communication according to the one-to-one type is possible between the first and at least one other terminal.

7. The method according to claim 5, wherein the setup of the subscriber profile allows during the execution of a communication according to the one-to-many type the execution of a communication between the terminal of an actor subscriber profile (9b) and a viewer totality (11b) comprised of the terminals of several viewer subscriber profiles.

8. The method according to claim 5, wherein the setup of the subscriber profile allows during the execution of a communication according to the many-to-one type the execution of a communication between the terminal of a viewer subscriber profile and an actor totality comprised of the terminals of several actor subscriber profiles (9b).

9. The method according to claim 5, wherein the setup of the subscriber profile executes during a communication according to the many-to-many type a communication within a terminal pool defined by a set of previously defined subscriber profiles.

10. The method according to claim 7, wherein the subscriber profiles belonging to at least one of the viewer totality, the actor totality or the terminal pool are freely definable by the at least one actor subscriber profile, the at least one viewer subscriber profile or by at least one moderator.

11. The method according to claim 1, wherein the freely selectable type of the data transmission taking place during the communication includes a selection between at least one of a communication in real time or a transmission and receipt of a previously recorded stream.

12. The method according to claim 1, wherein the freely selectable type of the data transmission taking place during the communication includes a selection between different communication channels, especially at least one of a video, an audio or a text channel, and a channel for a file transfer or a common access to web applications.

13. The method according to claim 1, wherein the multimedia communication is supplemented with an additional information and acknowledgment channel.

14. The method according to claim 1, wherein the terminals arranged in the communication network and the communication executed between the terminals are managed by a server or by a peer-to-peer network, wherein the at least one subscriber profile, which is managed by the server or the peer-to-peer network, executes a logical assignment between at least one terminal and a subscriber using the terminal, and the respective terminal is addressed by the logical assignment of the terminal to the subscriber profile.

15. The method according to claim 1, wherein the at least one subscriber profile sets and alters at least one of tag variables or similarity parameters, which are determined by an analysis on the system side, for defining basic communication functions, in particular for enable and blocking functions.

16. The method according to claim 14, wherein by the at least one subscriber profile general subscriber data, in particular personal data and data for a self-portrayal of the subscriber, are at least one of inputted or generated on the system side and displayed.

17. The method according to claim 1, wherein the at least one subscriber profile inputs and alters at least one link to at least one of at least one other subscriber profile or a stream.

18. The method according to claim 1, wherein an incorporation by at least one of a subscriber or a system administrator of own data or data of third providers, in particular files, plugins and internet services, into the at least one subscriber profile can be executed.

19. The method according to claim 1, wherein means for generating and operating a graphical user interface are used for executing the process.

20. A system for executing a process according to claim 1, said system comprising a communication network with a valid communication protocol, in particular the internet (1), a plurality of terminals (2) having means for transmitting and receiving multimedia contents, and a server (3) or a peer-to-peer network having means for operating a hierarchical layer structure consisting of a database layer (4) for managing subscriber data, terminal addresses and multimedia contents, a link layer (5) for executing a switched communication between the terminals, a subscriber layer (6) for operating subscriber profiles set up by the users of the terminals, and a front end layer (7) having means for generating and operating a graphical user interface.

* * * * *

UNITED STATES PATENT AND TRADEMARK OFFICE
CERTIFICATE OF CORRECTION

PATENT NO. : 8,402,099 B2
APPLICATION NO. : 12/675046
DATED : March 19, 2013
INVENTOR(S) : Von Werther et al.

It is certified that error appears in the above-identified patent and that said Letters Patent is hereby corrected as shown below:

In the Specifications:

Column 20
Line 22, "Zinc" should read --Zine--

In the Claims:

Column 22
Line 36, "terminals:" should read --terminals;--

Signed and Sealed this
Eighteenth Day of June, 2013

Teresa Stanek Rea
*Acting Director of the United States Patent and Trademark Office*